(12) United States Patent
Magli et al.

(10) Patent No.: US 10,990,660 B2
(45) Date of Patent: Apr. 27, 2021

(54) DEVICE AND METHODS FOR AUTHENTICATING A USER EQUIPMENT

(71) Applicant: POLITECNICO DI TORINO, Turin (IT)

(72) Inventors: Enrico Magli, Turin (IT); Giulio Coluccia, Grugliasco (IT); Diego Valsesia, Borgomanero (IT); Tiziano Bianchi, Prato (IT)

(73) Assignee: Politecnico Di Torino, Turin (IT)

( * ) Notice: Subject to any disclaimer, the term of this patent is extended or adjusted under 35 U.S.C. 154(b) by 245 days.

(21) Appl. No.: 16/343,301

(22) PCT Filed: Oct. 4, 2017

(86) PCT No.: PCT/IB2017/056103
§ 371 (c)(1),
(2) Date: Apr. 18, 2019

(87) PCT Pub. No.: WO2018/073681
PCT Pub. Date: Apr. 26, 2018

(65) Prior Publication Data
US 2019/0260739 A1    Aug. 22, 2019

(30) Foreign Application Priority Data
Oct. 19, 2016    (IT) .......................... 102016000105253

(51) Int. Cl.
*G06F 7/04* (2006.01)
*G06F 21/32* (2013.01)
(Continued)

(52) U.S. Cl.
CPC .............. *G06F 21/32* (2013.01); *G06F 21/44* (2013.01); *G06K 9/00* (2013.01); *G06K 9/00013* (2013.01);
(Continued)

(58) Field of Classification Search
CPC ........... G06F 21/32; G06F 21/44; G06K 9/00; G06K 9/00087; G06K 9/00013;
(Continued)

(56) References Cited

U.S. PATENT DOCUMENTS

| 7,953,976 B2 * | 5/2011 | Giles | H04L 63/08 |
| | | | 713/168 |
| 8,306,256 B2 * | 11/2012 | Muriello | G06F 21/44 |
| | | | 382/100 |

(Continued)

FOREIGN PATENT DOCUMENTS

GB        2 492 050 A        12/2012

OTHER PUBLICATIONS

International Search Report and Written Opinion dated Nov. 22, 2017, issued in PCT No. PCT/IB2017/056103, filed Oct. 4, 2017.

*Primary Examiner* — Gary S Gracia
(74) *Attorney, Agent, or Firm* — Workman Nydegger

(57) ABSTRACT

A device, a user equipment, and methods for registering and authenticating the user equipment are provided, wherein the user equipment includes an image sensor, communication components for communicating with the device, control and processing components configured for acquiring at least one image by way of the image sensor, generating an authentication sensor fingerprint on the basis of the at least one acquired image, coding at least one portion of the authentication sensor fingerprint by way of a random projection algorithm, so as to generate at least one compressed portion (W') of the authentication sensor fingerprint, transmitting, through the communication components, the at least one compressed portion (W') to the device.

22 Claims, 6 Drawing Sheets

(51) Int. Cl.
*G06F 21/44* (2013.01)
*G06K 9/00* (2006.01)
*G06K 9/46* (2006.01)
*H03M 13/13* (2006.01)
*H04L 9/06* (2006.01)
*H04L 29/06* (2006.01)
*H04W 12/06* (2021.01)
*G06F 15/16* (2006.01)

(52) U.S. Cl.
CPC ....... *G06K 9/00087* (2013.01); *G06K 9/4671* (2013.01); *H03M 13/13* (2013.01); *H04L 9/0643* (2013.01); *H04L 63/0861* (2013.01); *H04W 12/06* (2013.01)

(58) Field of Classification Search
CPC .... G06K 9/4671; H04W 12/06; H03M 13/13; H04L 63/0861; H04L 9/0643
See application file for complete search history.

(56) References Cited

U.S. PATENT DOCUMENTS 9,812,138 B1* 11/2017 Candebat ................ G06F 21/64
2002/0150282 A1* 10/2002 Kinsella .................. G06F 21/32
382/124
2004/0030660 A1* 2/2004 Shatford ............ G06Q 20/4012
705/67
2004/0098585 A1* 5/2004 Grove ..................... G06F 21/31
713/168
2007/0168674 A1* 7/2007 Nonaka .............. G07C 9/00309
713/182
2008/0028230 A1* 1/2008 Shatford ............... H04L 9/3231
713/186
2008/0285818 A1* 11/2008 Warren .................... G09B 7/02
382/124
2010/0214057 A1* 8/2010 Alvord .................. H04W 12/03
340/5.2
2014/0072188 A1* 3/2014 Liu .................... G06K 9/00979
382/125
2015/0154392 A1* 6/2015 Bao ........................ G06F 21/36
726/19
2016/0078271 A1* 3/2016 Hatcher, II ............. H04N 5/374
382/124
2016/0119346 A1* 4/2016 Chen ..................... H04L 63/123
713/170
2017/0124380 A1* 5/2017 Wang ................. G06K 9/00073
2017/0169293 A1* 6/2017 Valsesia ................... G06K 9/44

* cited by examiner

DEVICE AND METHODS FOR AUTHENTICATING A USER EQUIPMENT

BACKGROUND OF THE INVENTION

1. The Field of the Invention

The present invention relates to a device and a method for authenticating a user equipment, as well as to a user equipment and an authentication method for authenticating said user equipment by said device, in particular for authenticating a user equipment by using a fingerprint of an image sensor; furthermore, this invention also relates to a method for registering said user equipment by said device, in particular for creating a secret shared between said user equipment and said device, which allows for subsequent authentication of said user equipment.

2. The Relevant Technology

As is known, the authentication systems currently in use for most commercial applications (such as, for example, home banking, trading, electronic mail, social network services and the like) are based on the use of temporary passwords or codes generated by a password generator (also known as "security token"). These elements, however, suffer from the drawback that they can be easily stolen, e.g., via physical theft of the token or by using a backdoor software application that, when executed by the user's personal computer (PC), can gain access to said user's private files and/or to the cache where the most frequently used passwords are normally stored and/or to the memory area where one can read what is being entered by the user via a keyboard connected to the PC.

These types of attacks allow a third party to make a so-called electronic identity theft, allowing said third party to achieve criminal purposes, such as transferring money from the user's bank account to another bank account, sending e-mail messages from the user's account to all other addresses in the user's address book while minimizing the effects of any anti-spam filters, selling the stolen identity to another person, or the like.

Aiming at reducing the risk of successful identity theft, American patent U.S. Pat. No. 8,306,256 B2 granted to FACEBOOK INC. describes an authentication system based on the use of a fingerprint of an image sensor comprised in a user equipment (i.e., a smartphone, a tablet, or the like). This system, after having determined the fingerprint of a sensor on the basis of a plurality of photographs taken by said sensor, associates said fingerprint with a user account and stores said fingerprint on the server side, to be then reused for authenticating said user equipment on the basis of a photograph subsequently transmitted by it. Therefore, this authentication system uses the fingerprint of the sensor as a secret shared between the user equipment and the server that will have to authenticate said user equipment, so that the whole authentication system is vulnerable should one or more of said fingerprints be stolen (e.g., during a cyberattack), because a third party (i.e., the attacker) could generate artificial images by using one or more of said fingerprints and then use said artificial images in order to be authenticated by the authentication server, thereby completing the identify theft. In fact, with this system the fingerprint is totally computed on the server side, thus further simplifying the task of the attacker, who will only need to transmit an image taken by the user equipment (possibly retrieved on the Internet) or generated on the basis of the stolen fingerprint.

It should be noted that, following such an attack, security can be restored by having the user stop using said authentication system or by having the user change his/her user terminal, thus changing the image sensor and hence the associated fingerprint.

SUMMARY OF THE INVENTION

The present invention aims at solving these and other problems by providing a method and a device for authenticating a user equipment as set out in the appended claims.

In addition, the present invention provides also a user equipment and a method for authenticating said user equipment by said device, as set out in the appended claims.

Furthermore, the present invention provides a method for registering said user equipment by said device.

The basic idea of the present invention is to configure a user equipment for coding (compressing) a fingerprint by means of a random projection algorithm, and then transmitting said compressed fingerprint to the device by which said equipment must be authenticated, so that it is no longer necessary to provide some form of secret shared between the equipment and the device. In fact, the random projection algorithm allows coding the sensor fingerprint in an irreversible manner, i.e., in such a way that it will be impossible to (univocally) go back to said fingerprint starting from the version thereof coded by means of said algorithm; moreover, once the fingerprint has been coded by using said algorithm, the device 1 will no longer need to decode said fingerprint in order to allow the equipment to be authenticated, since the random projection algorithm preserves the distance between two fingerprints that have been compressed by using the same parameters, i.e., the seed of the random generator and the position of the outliers of the fingerprint, thereby allowing the device 1 to act solely upon compressed versions of the fingerprints.

It is thus possible to improve the security of an authentication system; in fact, it will be impossible to carry out an identity theft by stealing a fingerprint (on the server side), because said fingerprint will never be present in a server "in clear form", but only in a compressed format that cannot be traced back (univocally) to the "clear" fingerprint; in addition, should a third party (the attacker) succeed in generating fingerprints making an identity theft possible (e.g., by fraudulently gaining access to the user equipment), it would be possible to change the seed used by the random projection algorithm and register the user equipment again by the device into which said equipment must be authenticated, thus bringing the authentication system back into a secure condition.

Further advantageous features of the present invention are set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate. The references below are therefore used only for simplicity's sake and do not limit the protection scope or extent of the various embodiments.

Figure 1:
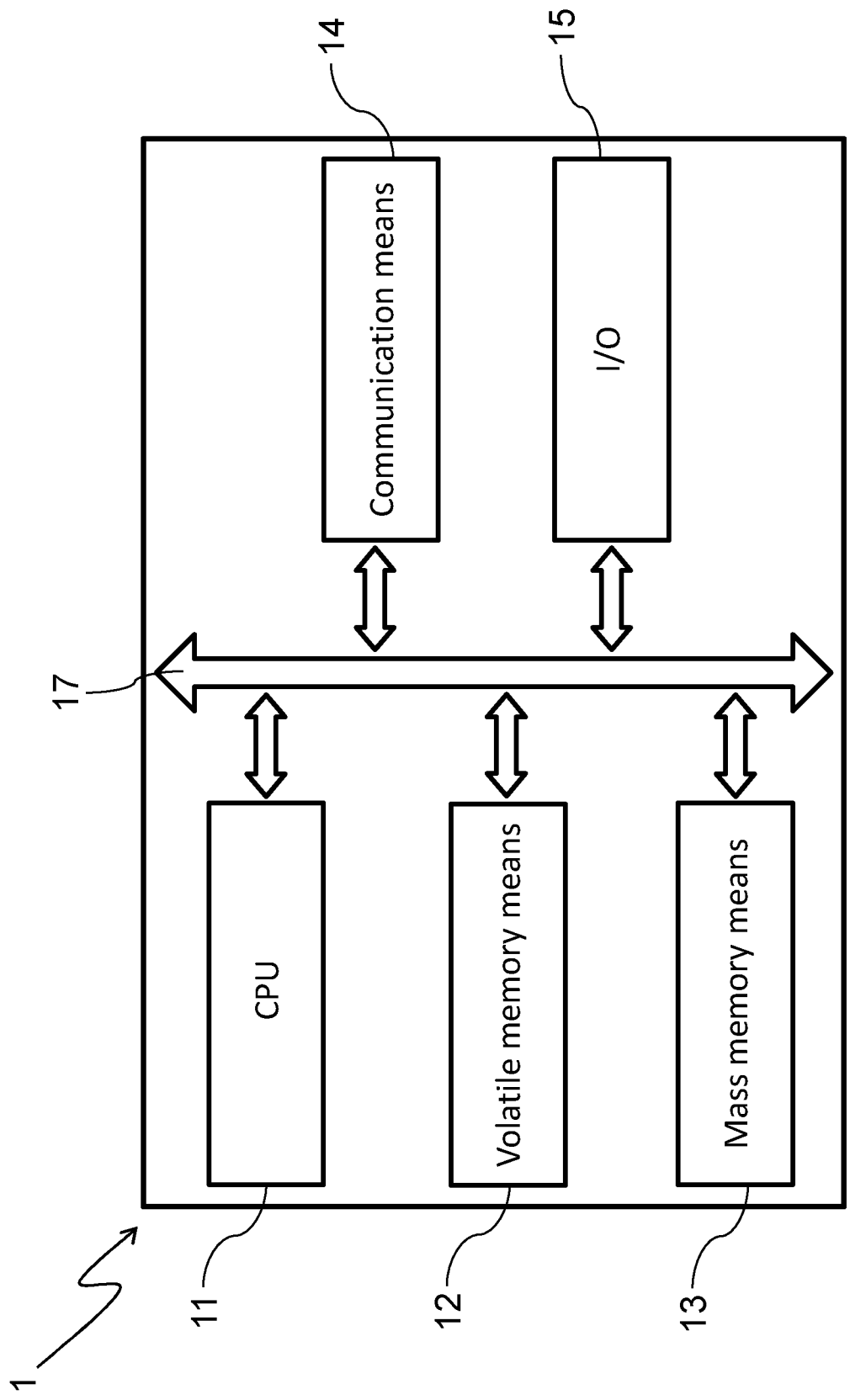
FIG. 1 shows a block diagram of a device for authenticating a user equipment according to the invention.

With reference to FIG. 1, an embodiment of a device 1 (e.g., a PC, a server, or the like) according to the invention comprises the following components:
- control and processing means 11, e.g., one or more CPUs, governing the operation of the device 1, preferably in a programmable manner, through the execution of suitable instructions;
- volatile memory means 12, e.g., a random access memory (RAM), in signal communication with the control and processing means 11, wherein said volatile memory means 12 store at least instructions that can be read by the control and processing means 11 when the device 1 is in an operating condition;
- mass memory means 13, preferably one or more magnetic disks (hard disks) or a Flash memory, or the like, in signal communication with the control and processing means 11 and with the volatile memory means 12, wherein said memory means 13 store at least the authentication data (also referred to as authentication information, as will be further described hereinafter);
- communication means 14, preferably a network interface operating in accordance with a standard of the IEEE 803.2 (also known as Ethernet) or 802.11 (also known as WiFi) or 802.16 (also known as WiMax) families or an interface for a GSM/GPRS/UMTS/LTE or TETRA data network or the like, which allow the device 1 to communicate with other devices through a data network, the latter being further described below);
- input/output (I/O) means 15, which may be used, for example, for connecting said device 1 to peripherals (e.g., one or more interfaces allowing access to other mass memory means, so as to preferably allow copying information from the latter to the mass memory means 13) or to a programming terminal configured for writing instructions (which the control and processing means 11 will have to execute) into the memory means 12,13; such input/output means 15 may comprise, for example, a USB, Firewire, RS232, IEEE 1284 adapter or the like;
- a communication bus 17 allowing information to be exchanged among the control and processing means 11, the volatile memory means 12, the mass memory means 13, the communication means 14, and the input/output means 15.

As an alternative to the communication bus 17, the control and processing means 11, the volatile memory means 12, the mass memory means 13, the communication means 14, and the input/output means 15 may be connected by means of a star architecture.

It must be pointed out right away that the mass memory means 13 may be replaced with remote mass memory means (e.g., a Storage Area Network—SAN) not comprised in said device 1; for such a purpose, the input/output (I/O) means 15 may comprise one or more mass memory access interfaces, such as, for example, FC (Fibre Channel) and/or iSCSI (Internet SCSI) interfaces, so that the device 1 can be configured for having access to said remote mass memory means.

Figure 2:
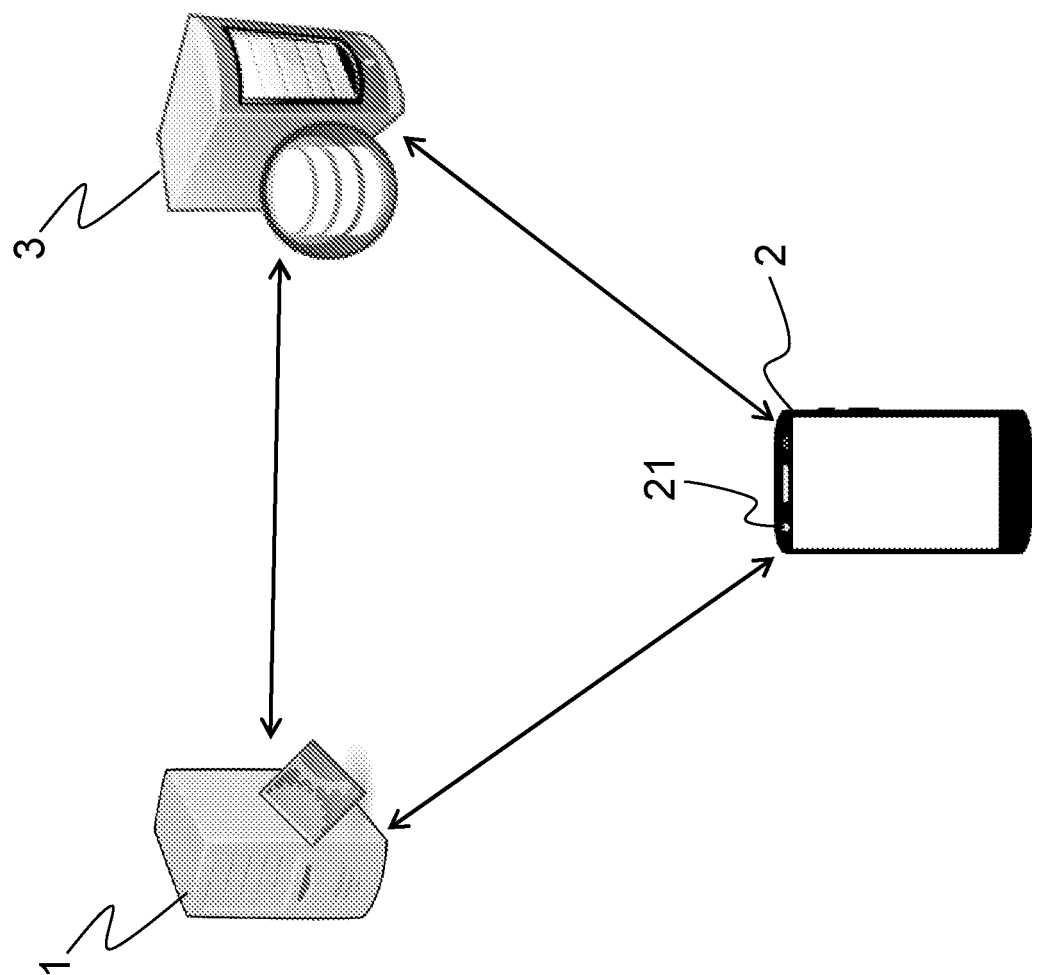
FIG. 2 shows an authentication system comprising the device of FIG. 1 and a user equipment according to the invention.

Also with reference to FIG. 2, the following will describe an authentication system S in a typical operational scenario; said authentication system S comprises the following parts:
- the device 1 providing an authentication service;
- a user equipment 2, e.g., a smartphone, a tablet, or the like);
- an application server 3 adapted to provide at least one service (e.g., a social network service, an electronic mail service, a trading service, a home banking service, or the like) that requires authentication of the user equipment 2, i.e., that needs to ascertain that the user equipment 2 is the same user equipment with which a particular account has been associated during a registration phase (which will be further described below) and with which private and/or personal services have been associated (e.g., access to a person's or company's bank account, access to a person's or company's profile on a social network service like Facebook, or the like).

The device 1, the user equipment 2 and the application server 3 are in signal communication with one another through a data network, preferably a public data network (e.g., the Internet).

The device 1 may consist of one or more servers appropriately configured for forming a cluster, and is preferably configured for receiving from the application server 3 at least one authentication request after the user equipment 2 has requested said application server 3 to grant access to private and/or personal services, i.e., services that require authentication of said user equipment 2; said authentication request includes user information such as, for example, a string of characters containing at least one code capable of univocally identifying the user equipment 2 (such as the IMEI code, the MAC address, or the like), a username, or the like.

The user equipment 2 comprises an image sensor 21 (e.g., a photographic sensor, a night vision sensor, or the like) and elements that are functionally similar to those already described with reference to the device 1 (i.e., control and processing means, volatile memory means, mass memory means, communication means and input/output means) in signal communication with one another and configured for executing different functions, which will be further described hereinafter; said user equipment 2 may also consist of, as an alternative, a personal computer, a laptop, or another electronic device in signal communication with an image sensor (e.g., a webcam), preferably comprised (integrated) in said user equipment 2.

The application server 3 comprises elements that are functionally similar to those of the device 1 (i.e., control and processing means, volatile memory means, mass memory means, communication means and input/output means) in signal communication with one another and configured for executing different functions, which will be further described hereinafter; furthermore, said application server 3 may also coincide with the device 1, when the service requiring authentication of the user equipment 2 and the authentication service are provided by the same machine.

When the system S is in an operating condition, the elements 1,2,3 of said system preferably carry out the following steps:

- the user equipment 2 accesses the public services provided by the application server 3 (e.g., by accessing the "landing page" of the service provided by said server 3) and transmits its own user information in order to request access to said at least one service requiring authentication of said user equipment 2;
- The application server 3 generates an authentication request on the basis of the user information received from the user equipment (e.g., by creating a message including at least said user information) and transmits said authentication request to the device 1;
- the device 1 prompts the user equipment 2 to supply an authentication sensor fingerprint, which will be further described hereinafter;
- the user equipment 2 acquires at least one image (preferably of a homogeneous surface, e.g., a wall, a floor, a ceiling, a sky portion, or the like) by means of the image sensor 21, determines said authentication sensor fingerprint on the basis of said at least one image, codes (or compresses) said authentication sensor fingerprint by executing a set of instructions implementing the random projection algorithm (which will be further described hereinafter), and transmits an authentication message, which contains at least said compressed authentication fingerprint, to the device 1;
- the device 1 determines, on the basis of the authentication message received, whether the user equipment 2 can be authenticated or not by executing the authentication method according to the invention (which will be described in detail hereinafter), generates, on the basis of the result of the execution of the authentication method according to the invention, an authentication result message containing authentication result information that defines whether the user equipment can be authenticated or not, and transmits said authentication result message to said application server 3 via the communication means 14;
- the application server either allows or denies access to said at least one service requiring authentication on the basis of said authentication result message.

Figure 3:
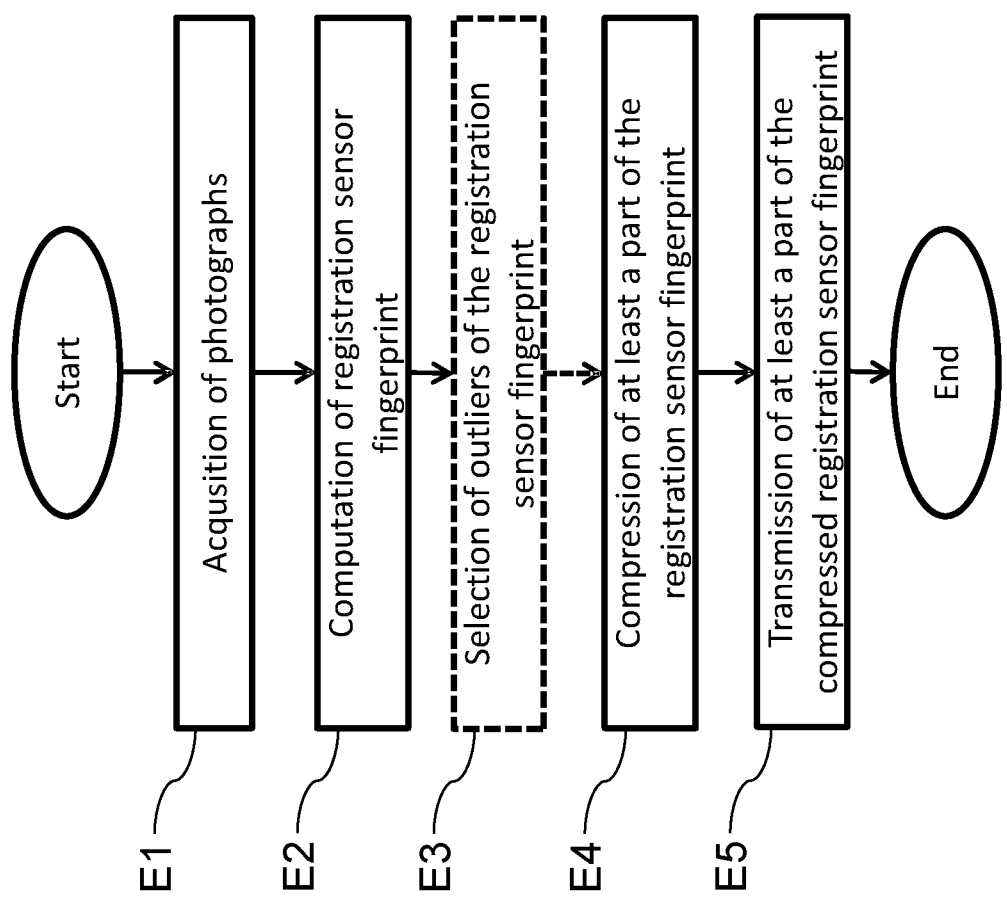
FIG. 3 shows a flow chart that represents the method for registering the user equipment by the device of FIG. 1 according to the invention.

Also with reference to FIG. 3, the following will describe the method for registering said user equipment 2 by the device 1, so as to allow for subsequent authentication of said user equipment 2 by said device 1. The registration method, which is preferably carried out by said user equipment 2, comprises the following phases:

- an image acquisition phase E1, wherein a plurality of images (preferably 10 to 30 images) are acquired by the image sensor 21, preferably in RAW format so as to highlight the defects of the sensor 21, which are due to impurities in its silicon portions;
- a registration fingerprint computation phase E2, wherein a registration sensor fingerprint is generated, through the control and processing means of said user equipment, on the basis of said plurality of images acquired during said phase E1;
- a registration fingerprint compression phase E4, wherein said at least one compressed portion (W) of said registration sensor fingerprint is coded (compressed), through the control and processing means of the user equipment 2, by using a random projection algorithm, so as to generate at least one compressed portion W of said registration sensor fingerprint. For example, the control and processing means of the user equipment 2 are configured for executing a set of instructions implementing said random projection algorithm (which will be further described hereinafter);
- a registration fingerprint transmission phase E5, wherein at least one portion of said compressed registration sensor fingerprint is transmitted to the device 1 through the communication means of said user equipment 2, preferably over a secure channel (e.g., an SSL connection or the like).

Figure 4:
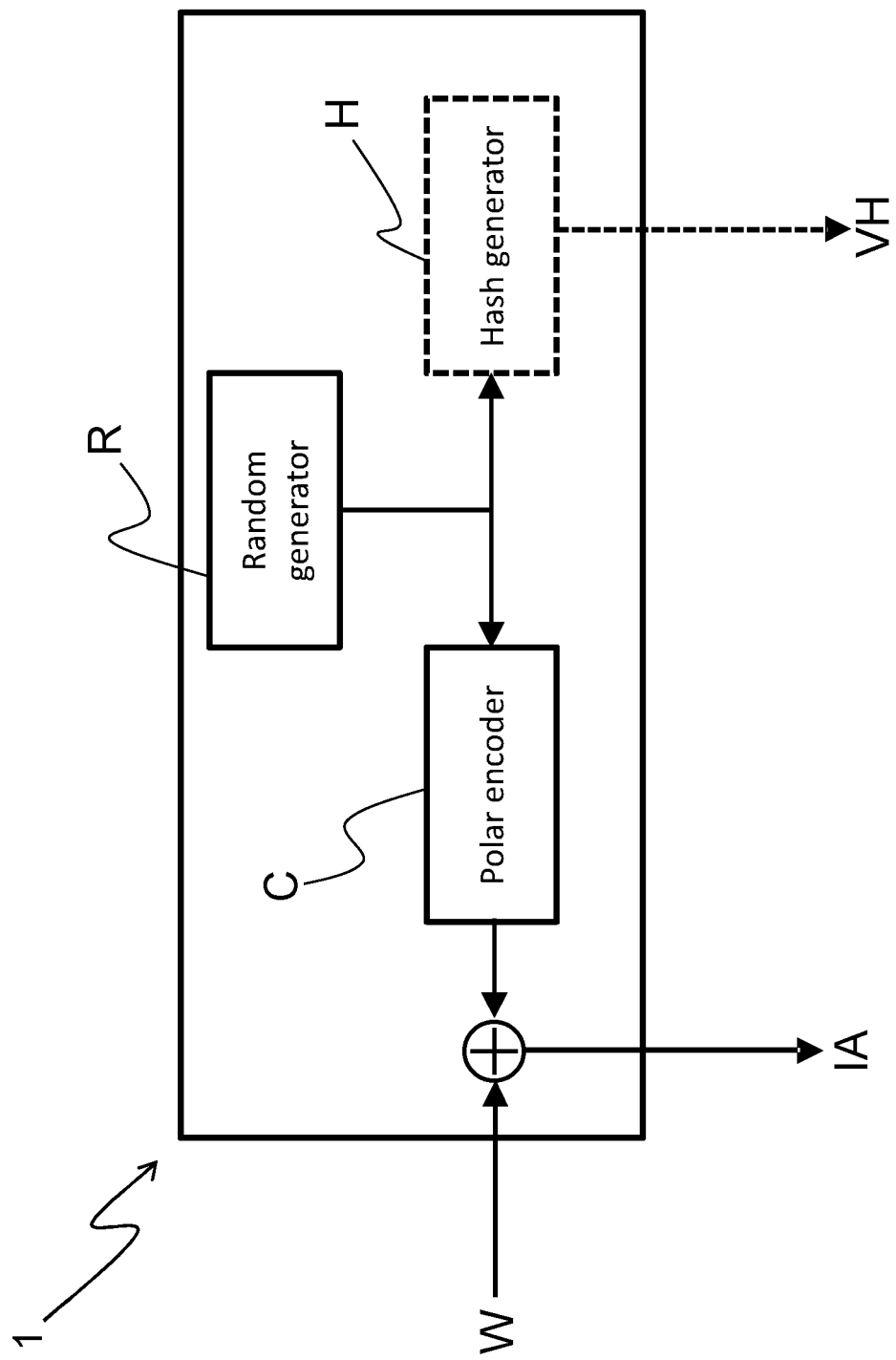
FIG. 4 shows a block diagram that represents the logic parts used by the device of FIG. 1 during the execution of the registration method of FIG. 3.

Also with reference to FIG. 4, the following will describe the operations carried out by the device 1 after the registration fingerprint transmission phase E5, i.e., after said device 1 has received at least one compressed portion W of said registration sensor fingerprint.

For a better understanding of the operations carried out by the device 1, it can be assumed that said device comprises the following logic blocks: a random generator R and a polar encoder C. It must be pointed out right away that said logic blocks can be implemented either as dedicated physical components (e.g., suitable integrated circuits or the like) or as a set of instructions to be executed by the control and processing means 11, implementing a (pseudo) random number generator algorithm and/or a polar coding algorithm (e.g., like the one described by Mandavifar et al. in "Achieving the secrecy capacity of wiretap channels using polar codes," *IEEE Transactions on Information Theory*, vol. 57, no. 10, pp. 6428-6443, October 2011).

The device 1 is configured for executing, after having received at least one compressed portion W of the registration fingerprint, the following additional phases of the registration method according to the invention:

- a random generation phase, wherein a (pseudo) random bit string preferably having a predefined length is generated, preferably by a cryptographic random generator (random generator R);
- a coding phase, wherein said random bit string is coded by the control and processing means 11 by using a polar coding technique (polar encoder C), so as to obtain a coded random string;
- an authentication information generation phase, wherein authentication information IA is generated, through the control and processing means 11, on the basis of said coded random string and said at least one compressed portion W of the registration fingerprint;
- a validation information generation phase, wherein validation information is generated, through the control and processing means 11, on the basis of the (uncoded) (pseudo) random bit string, wherein said validation allows verifying whether a user equipment can be authenticated or not;
- a storing phase, wherein said authentication information IA is stored, along with said validation information, into the volatile memory means 12 and/or the mass memory means 13.

As shown in FIG. 4, the generation of the authentication information IA (authentication information generation phase) can preferably be carried out by executing a bitwise exclusive-OR (bitwise-XOR) operation between the coded random string and said at least one portion W of the registration fingerprint. In other words, the authentication information comprises a bit string computed by executing a bitwise exclusive-OR (bitwise-XOR) operation between the coded random string and said at least one compressed portion W of the registration fingerprint. Therefore, the authentication information IA will not include any "clear" information, thus improving the security of the authentication system S.

In addition to or in combination with the above, the generation of the validation information, if provided, can preferably be carried out by computing, through a hash generator H (which in FIG. 4 is modelled as a logic block), a hash VH of the (pseudo) random bit string generated by the generator R, preferably by executing a set of instructions implementing a cryptographic hashing algorithm, such as, for example, the Secure Hash Algorithm (SHA) in one of its many variants or another algorithm. In other words, the validation information comprises a bit string obtained by computing a (cryptographic) hash VH of the generated (pseudo) random bit string. This will prevent that, from the validation information (which, since it resides in the device 1, could be stolen during a cyberattack), one might go back to the exact (pseudo) random bit string generated by the generator R, thus further improving the level of security of the authentication system S.

As an alternative to the above, the validation information may comprise the (uncoded) (pseudo) random bit string.

Figure 5:
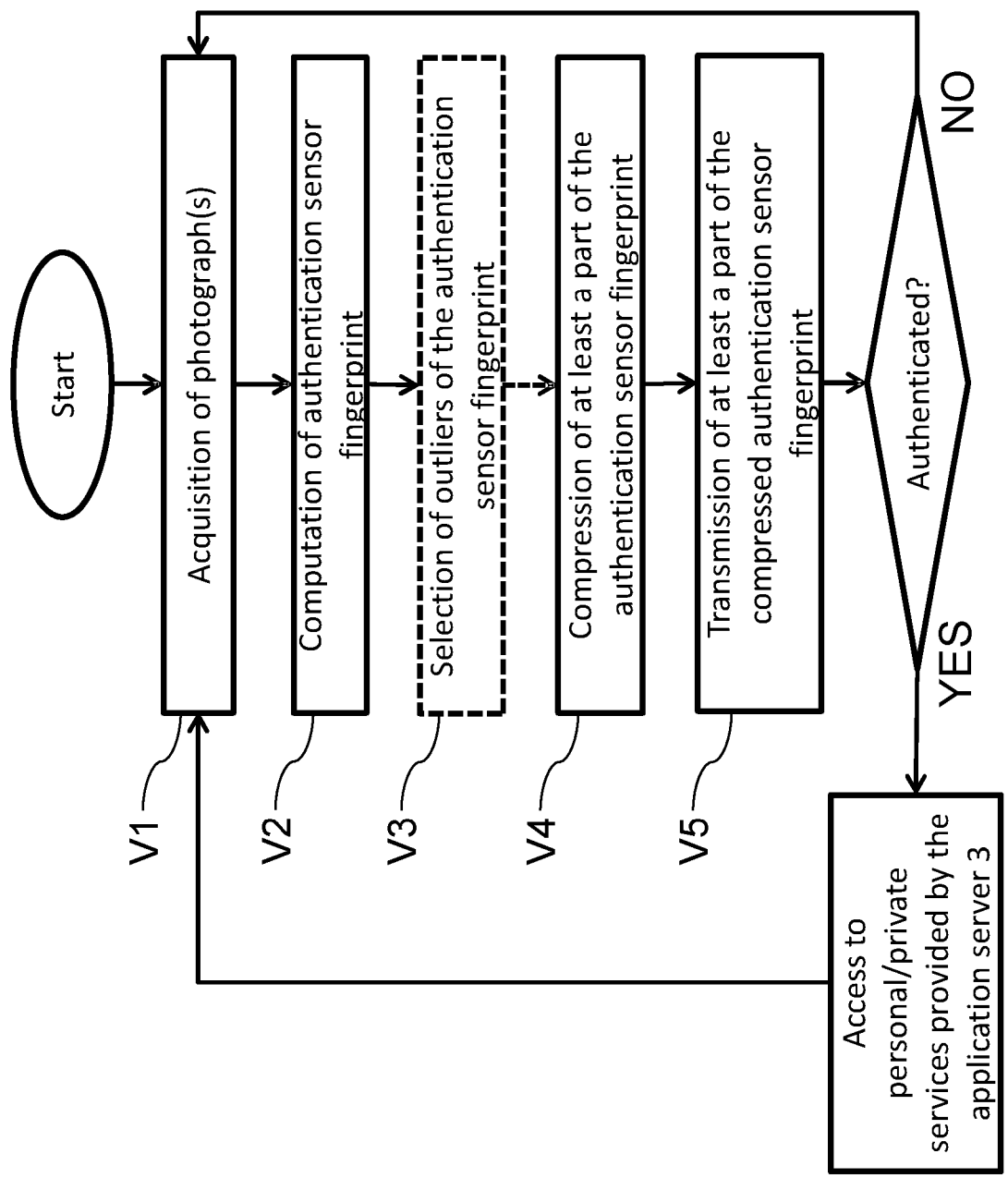
FIG. 5 shows a flow chart that represents the authentication method according to the invention.

Also with reference to FIG. 5, the following will describe the method for authenticating said user equipment 2 by said device 1. The authentication method, which is preferably carried out by said user equipment 2, comprises the following phases:
- an image acquisition phase V1, wherein at least one image (preferably one to five images) is acquired by the image sensor 21, preferably in RAW format for the same reasons as already stated;
- an authentication fingerprint computation phase V2, wherein an authentication sensor fingerprint is generated, through the control and processing means of said user equipment 2, on the basis of said plurality of images acquired during said phase V1;
- an authentication fingerprint compression phase V4, wherein at least one portion of said authentication sensor fingerprint is coded, through the control and processing means of the user equipment 2, by using a random projection algorithm, so as to generate at least one compressed portion W' of said authentication sensor fingerprint (for example, by configuring the control and processing means of the user equipment 2 for executing a set of instructions implementing said random projection algorithm);
- an authentication fingerprint transmission phase V5, wherein said at least one compressed portion W' of said authentication sensor fingerprint is transmitted to the device 1 through the communication means of said user equipment 2, preferably over a secure communication channel (e.g., SSL or the like).

During each one of the phases E4, V4, the sensor fingerprints computed during the phases E2 or E3 and V2 or V3 are compressed by using the random projection (RP) technique. In other words, during each one of the phases E4, V4, the control and processing means of the user equipment 2 are configured for executing a set of instructions implementing a compression algorithm that utilizes the random projection technique.

As aforementioned, this algorithm compresses the registration and authentication sensor fingerprints with very little or, ideally, no information loss. More in detail, the random projection technique is a powerful, though simple, method of dimensional reduction based on the idea of projecting the original n-dimensional data onto an m-dimensional subspace, with m<n, by using a random matrix $\Phi \in \mathbb{R}^{m \times n}$. As a result, an n-dimensional sensor fingerprint $k \in \mathbb{R}^n$ will be reduced to an m-dimensional sub-space $y \in \mathbb{R}^m$ according to the following formula:

$$y = \Phi k \qquad (8)$$

The underlying key property of the RP technique is the Johnson-Lindenstrauss lemma (which is considered to be an integral part of this description), which relates to low-distortion embeddings of points from high-dimensional Euclidean spaces into low-dimensional Euclidean spaces. The lemma states that a small set of points in a high-dimensional space can be embedded into a space of much smaller dimensions in such a way that the distances between the points are (nearly) preserved.

Based on this assumption, the user equipment 2 can be configured for computing a compressed version of each sensor fingerprint computed by it by means of random projections, i.e., via multiplication (matrix product) between a compression matrix and a matrix that represents said sensor fingerprint (or vice versa), wherein said compression matrix has a number of rows (or columns) which is smaller than that of the matrix that represents the sensor fingerprint of a camera.

The result of said product can be quantized, i.e., represented on a finite number of bits, for the purpose of obtaining a more compact representation of the compressed version of the sensor fingerprint. For example, a binary version of the compressed sensor fingerprint can be obtained with the following formula:

$$w = \text{sign}(y)$$

By so doing, it is possible to send a compressed version of the (registration or authentication) sensor fingerprint by transmitting less data and, most importantly, without requiring the device 1 to carry out a phase of decompressing the received data, which would result in degradation of the security properties of the authentication system S. Thus, the reduction in the spatial complexity to be handled by the device 1 will also allow said device 1 to process a larger number of authentication requests, thereby improving the level of security of the authentication system S.

The security of the system is further increased by the random projection generation method because the latter is based on the use of a pseudo-random number generator initialized by a seed that is kept secret in the user equipment. Different users will use different seeds, so that it will not be possible to replicate a given compressed sensor fingerprint without knowing its seed.

Figure 6:
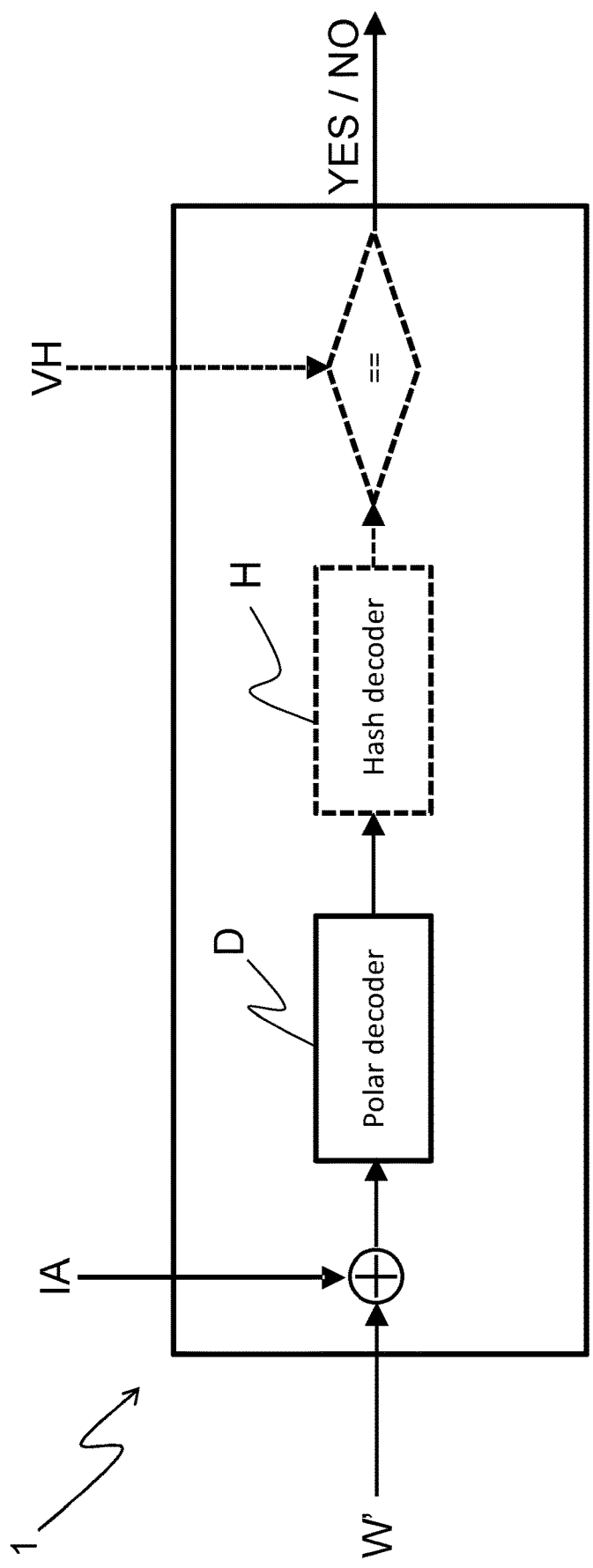
FIG. 6 shows a block diagram that represents the logic parts used by the device of FIG. 1 during the execution of the authentication method according to the invention.

Also with reference to FIG. 6, the following will describe the operations carried out by the device 1 after the authentication fingerprint transmission phase V5, i.e., after said device has received at least one compressed portion W' of said authentication sensor fingerprint.

It must be pointed out that the portion W' of the authentication fingerprint is less accurate than the portion W of the registration fingerprint because the authentication fingerprint is determined over a smaller number of images. This is due to the fact that said authentication fingerprint must be computed every time the user terminal 2 needs to be authenticated by the device 1, i.e., every time said user terminal 2 needs to gain access to private/personal services provided by the application server 3, and the authentication process should normally take less time than the registration process. It must also be pointed out that, since the authentication fingerprint is, de facto, a measurement of a characteristic of the sensor, two distinct authentication fingerprints determined at distinct time instants will never be equal, because they will be affected by noise (e.g., thermal noise), just like any other measurement.

For a better understanding of the operations carried out by the device 1, it can be assumed that said device comprises a polar decoder D. It must be pointed out right away that, just like the polar encoder C and the random generator R, the polar decoder D is modelled as a logic block that can be implemented either as dedicated physical components (e.g., suitable integrated circuits or the like) or as a set of instructions to be executed by the control and processing means 11, implementing a polar decoding algorithm (e.g., like the one described by Mandavifar et al. in "Achieving the secrecy capacity of wiretap channels using polar codes", *IEEE Transactions on Information Theory*, vol. 57, no. 10, pp. 6428-6443, October 2011).

The device 1 is configured for executing the following phases of the method for authenticating the user equipment 2 according to the invention:
 a reception phase, wherein at least one compressed portion W' of an authentication sensor fingerprint generated by the user equipment 2 is received through the communication means 14;
 an authentication string deciphering phase, wherein a coded authentication string is computed, through the control and processing means 11, on the basis of said at least one compressed portion W' of the authentication fingerprint and the authentication information IA;
 an authentication string decoding phase, wherein said coded authentication string is decoded, through the control and processing means 11, by using a polar decoding technique (polar decoder D), so as to obtain an authentication string,
 a validation phase, wherein it is verified by the control and processing means 11, on the basis of the authentication string, whether the user equipment 2 can be authenticated or not, e.g., by comparing the authentication string with the validation information (preferably, the hash VH) associated with said user equipment.

Polar coding/decoding allows correcting the differences that are advantageously present between the authentication sensor fingerprint (from which W' is then computed) and the registration sensor fingerprint (from which W is then computed) with probability margin that can be verified. Thus, a user equipment 2 can be authenticated by using only a few images (or even just one) with a probability higher than eighty percent, while this makes it practically impossible to authenticate another user equipment having a different image sensor or to use publicly available images taken by the same sensor and compressed with lossy methods, such as, for example JPEG or another format.

The authentication string deciphering phase can be carried out by executing a bitwise exclusive-OR (bitwise-XOR) operation between the authentication information IA and said at least one compressed portion W' of the authentication fingerprint.

As already described with reference to the registration method, the validation information may be a hash VH of the (pseudo) random bit string (generated by the generator R), preferably obtained by executing a set of instructions implementing a cryptographic hashing algorithm, such as, for example, the Secure Hash Algorithm (SHA) in one of its many variants or another hashing algorithm. In this case, the validation phase carried out by the device 1 comprises the following steps:
 computing a hash of the authentication string;
 comparing said hash with the validation information VH, preferably by making a bitwise comparison between said hash and the validation information VH. If the comparison has a successful outcome (i.e., if the hash and the validation information VH are identical), then the user equipment 2 will be authenticated; otherwise (i.e., if the hash and the validation information VH show some differences), then the user equipment 2 will not be authenticated.

In the case wherein the validation information comprises the (pseudo) random bit string, the authentication string is compared with said validation information, e.g., by making a bitwise comparison between said authentication string and said (pseudo) random bit string. Similarly to the above description, if the comparison has a successful outcome (i.e., the authentication string and the random bit string are identical), then the user equipment 2 will be authenticated; otherwise (i.e., if the authentication string and the random bit string show some differences), then the user equipment 2 will not be authenticated.

During the phases E2 and V2, the (registration or authentication) sensor fingerprint is extracted by executing a set of instructions implementing a regression algorithm. More in detail, the output of the sensor is preferably modelled as follows:

$$o = g^\gamma \cdot [(1+k) \cdot i + e]^\gamma + q. \qquad (1)$$

where $g^\gamma$ is the gamma correction (g is different for each colour channel and γ is normally close to 0.45), e models the noise sources internal to the sensor, q models the noise external to said sensor (e.g., the quantization noise), k models the sensor fingerprint (a matrix having the same dimensions as the images produced by the sensor 21) to be extracted, i is the intensity of the light hitting the sensor. In order to extract k, the formula (1) can be approximated to the first term of Taylor's series:

$$o = o^{id} + o^{id} \cdot k + \tilde{e} \qquad (2)$$

where $o^{id} = (gi)^\gamma$ is the ideal output of the image sensor, $o^{id} \cdot k$ is the photo-response non-uniformity (PRNU) of the image sensor the fingerprint k of which is to be extracted, and $\tilde{e} = \gamma o^{id} \cdot e/i + q$ groups all other noise sources.

Assuming that it is possible to produce a noiseless version $o^{dn}$ through an appropriate filtering process, and that such noiseless version can be used instead of the ideal output $o^{id}$, then it can be written that $$w = o - o^{dn} = o \cdot k + \tilde{q} \qquad (3)$$

where q groups all the errors in the model. Assuming that a number of images C≥1 is available and considering ~ as Gaussian noise not dependent on the signal o·k and having a mean equal to zero and a variance $\sigma^2$, the following relation can be written for each image l, l=1, . . . , C:

$$w^{(l)}/o^{(l)} = k + \tilde{q}/o^{(l)}, \text{ where } w^{(l)} = o^{(l)} - o^{(l)dn} \qquad (4)$$

Therefore, the estimate of k, i.e., the maximum likelihood estimate $\hat{k}$, can be obtained as $$\hat{k} = \sum_{l=1}^{C} (w^{(l)} \cdot o^{(l)}) \Big/ \sum_{l=1}^{C} (o^{(l)})^2 \qquad (5)$$

And the variance of this estimate is given by $$\sigma_{\hat{k}}^2 = \sigma^2 \bigg/ \sum_{f=1}^{C} (o^{(f)})^2 \qquad (6)$$

where it can be noticed that the images from which the best sensor fingerprints can be extracted are those images which have high luminance (without however being saturated) and regular contents (thus lowering the variance $\sigma^2$ of the noise $\hat{q}$). In order to further improve the quality of the estimate ^, the artifacts that are common among image sensors of the same brand and/or model can be removed by subtracting the mean values of the rows and columns from the values of the estimate $\hat{k}$.

When the images acquired by the image sensor 21 are colour images, the estimate must be conducted separately for each colour channel (red, green, blue), i.e., a maximum likelihood estimate must be obtained for each channel, i.e., $\hat{k}_R$ for the red channel, $\hat{k}_G$ for the green channel, and $\hat{k}_B$ for the blue channel. Afterwards, a "global" fingerprint can be obtained by applying any RGB-to-greyscale conversion, such as, for example, the following:

$$\hat{k} = 0.3\hat{k}_R + 0.6\hat{k}_G + 0.1\hat{k}_B \qquad (7)$$

The man skilled in the art may however use a regression algorithm other than the one described above, without however departing from the teachings of the present invention.

Aiming at further improving the quality of the registration and authentication sensor fingerprints, each image acquired by the image sensor 21 can be filtered through a Wiener filter suitable for removing all periodic artifacts before the sensor fingerprints are extracted (computed). In other words, the control and processing means of the user equipment 2 may also be configured for executing, at the beginning of the phase E2 and/or of the phase V2, a set of instructions applying the Wiener filtering algorithm to said at least one image acquired during the image acquisition phase E1,V1 before the generation of the authentication sensor fingerprint, so as to remove all periodic artifacts from said at least one image. This will improve the capability of the system S of discerning between two fingerprints coming from two distinct image sensors, thereby increasing the level of security of the authentication system S.

In combination with or as an alternative to the above, the registration method and the authentication method according to the invention may also comprise, respectively, a registration sensor fingerprint part selection phase E3 and an authentication sensor fingerprint part selection phase V3.

During each one of the phases E3,V3, only those components of the sensor fingerprints which have a frequency higher than a given threshold are preferably selected. In other words, during each one of the phases E3,V3, the control and processing means of the user equipment 2 are configured for executing the following steps:

transforming the fingerprint computed during the phase E2 or the phase V2 in a transformed domain, so as to obtain a transformed fingerprint; this can be done, for example, by executing a set of instructions implementing a transformation algorithm, such as the Discrete Cosine Transform (DCT) or the 2D Fast Fourier Transform (2D FFT), or the like;

selecting those pixels of the transformed fingerprint which have a horizontal and/or vertical spatial frequency greater than a predefined threshold value;

anti-transforming said selected pixels of the transformed fingerprint, e.g., by executing a set of instructions implementing an anti-transformation algorithm, such as the Inverse Discrete Cosine Transform (DCT) or the (2D Inverse Fast Fourier Transform (2D IFFT), or the like.

By so doing, a (registration or authentication) sensor fingerprint is obtained which contains only the "high" frequency components. This becomes particularly advantageous when such frequency components are higher than the maximum frequencies contained in images compressed by using the most common compression formats (e.g., JPEG or the like), which are often used for publishing self-produced contents on the Internet. It will thus be practically impossible to generate a valid authentication sensor fingerprint starting from a set of images taken by one same user terminal and then published on the Internet (even knowing also the seed used by the random projection algorithm), because the frequency components of the fingerprint that are used by the system S in order to authenticate the user equipment 2 are not present in the compressed images. This improves the level of security of the authentication system S.

Although this description has tackled some of the possible variants of the invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. An authentication device, comprising:
   a network interface for communicating with at least one user equipment,
   memory containing at least one piece of validation information (VH) associated with said user equipment,
   a central processing unit (CPU) control in communication with said memory and said network interface,
   wherein the CPU is configured for:
   receiving, through the network interface, at least one compressed portion (W') of an authentication sensor fingerprint generated by the user equipment, wherein said compressed portion (W') has been coded by the user equipment by means of a random projection algorithm,
   deciphering, by means of authentication information (IA) contained in the memory, a coded authentication string by deciphering said at least one compressed portion (W'), wherein said authentication information (IA) was previously generated on the basis of at least one portion (W) of a registration fingerprint and a random string coded by using a polar coding technique,
   decoding said coded authentication string by using a polar decoding technique, so as to obtain an authentication string,
   verifying when said user equipment can be authenticated by comparing the authentication string with the validation information (VH) previously generated on the basis of said random string.

2. The device according to claim 1, wherein the authentication information (IA) comprises a bit string computed by executing a bitwise exclusive-OR operation between said at least one portion (W) of the registration fingerprint and the random string coded by using a polar coding technique, and wherein the CPU deciphers the coded authentication string by executing a bitwise exclusive-OR operation between said at least one compressed portion (W') and the authentication information (IA).

3. The device according to claim 1, wherein the validation information comprises the random string in clear form.

4. The device according to claim 1, wherein the validation information comprises a hash (VH) of the random string in clear form, and wherein the CPU is also configured for computing a hash of said authentication string.

5. The device according to claim 4, wherein the verification of the authenticity of the user equipment is carried out by making a bitwise comparison between the hash of said authentication string and the validation information (VH).

6. A method for authenticating a user equipment, comprising:
   a reception phase, wherein at least one compressed portion (W') of an authentication sensor fingerprint generated by the user equipment is received through a network interface, said compressed portion (W') having been coded by the user equipment by means of a random projection algorithm,
   an authentication string deciphering phase, wherein a coded authentication string is computed, through a central processing unit (CPU), by deciphering said at least one compressed portion (W') by means of authentication information (IA) previously generated on the basis of at least one portion (W) of a registration fingerprint and a random string coded by using a polar coding technique,
   an authentication string decoding phase, wherein said coded authentication string is decoded, through the CPU, by using a polar decoding technique, so as to obtain an authentication string,
   a validation phase, wherein it is verified, through the CPU, when the user equipment can be authenticated by comparing the authentication string with validation information (VH) previously generated on the basis of said random string.

7. The method according to claim 6, wherein the authentication information (IA) comprises a bit string computed by executing a bitwise exclusive-OR operation between said at least one portion (W) of the registration fingerprint and the random string coded by using a polar coding technique, and wherein during the authentication string deciphering phase the coded authentication string is deciphered by executing a bitwise exclusive-OR operation between said at least one compressed portion (W') and the authentication information (IA).

8. The method according to claim 6, wherein the validation information comprises the random string in clear form.

9. The method according to claim 6, wherein the validation information (VH) comprises a hash of the random string in clear form, and wherein during the authentication string decoding phase a hash of said authentication string is computed by the CPU.

10. The method according to claim 9, wherein the validation phase is carried out by making a bitwise comparison between the hash of said authentication string and the validation information (VH).

11. The computer program product which can be loaded into the memory of an electronic computer, and which comprises portions of software code for executing the phases of the method according to claim 6.

12. A user equipment configured for being authenticated by the authentication device according to claim 1, comprising:
   an image sensor adapted to acquire images,
   a network interface for communicating with said device,
   central processing unit (CPU) in communication with said image sensor, and configured for acquiring at least one image by means of said image sensor,
   wherein the CPU is also configured for:
   generating an authentication sensor fingerprint on the basis of said at least one acquired image,
   coding at least one portion of said authentication sensor fingerprint by means of a random projection algorithm, thereby generating at least one compressed portion (W') of said authentication sensor fingerprint,
   transmitting, through the network interface, said at least one compressed portion (W') of said authentication sensor fingerprint to the device.

13. The user equipment according to claim 12, wherein the CPU of the apparatus is also configured for executing a set of instructions which, before the authentication sensor fingerprint is generated, applies the Wiener filtering algorithm to said at least one acquired image, so as to remove all periodic artifacts from said at least one image.

14. The user equipment according to claim 12, wherein the CPU is configured for executing, after having generated the authentication sensor fingerprint, the steps of:
   transforming the computed fingerprint in a transformed domain, so as to obtain a transformed fingerprint,
   selecting those pixels of the transformed fingerprint which have a horizontal and/or vertical spatial frequency greater than a threshold value, and
   anti-transforming said selected pixels of the transformed fingerprint.

15. An authentication method for authenticating a user equipment by a device, comprising:
   an image acquisition phase (V1), wherein at least one image is acquired by an image sensor,
   an authentication fingerprint computation phase (V2), wherein an authentication sensor fingerprint is generated by said user equipment on the basis of said at least one acquired image,
   an authentication fingerprint compression phase (V4), wherein at least one portion of said authentication sensor fingerprint is ciphered by said user equipment by using a random projection algorithm, so as to generate at least one compressed portion (W') of said authentication sensor fingerprint,
   an authentication fingerprint transmission phase (V5), wherein said at least one ciphered portion (W') is transmitted to the device from said user equipment, so that said device:
   deciphers, by means of authentication information (IA), a coded authentication string by deciphering said at least one ciphered portion (W'), wherein said authentication information (IA) was previously generated on the basis of at least one portion (W) of a registration fingerprint and a random string coded by using a polar coding technique,
   decodes said coded authentication string by using a polar decoding technique, so as to obtain an authentication string, and
   verifies if said user equipment can be authenticated by comparing the authentication string with validation information (VH) previously generated on the basis of said random string.

16. The method according to claim 15, wherein during the authentication fingerprint computation phase (V2) a set of instructions is executed which, before the authentication sensor fingerprint is generated, applies the Wiener filtering algorithm to said at least one image acquired during the image acquisition phase (V1), so as to remove all periodic artifacts from said at least one image.

17. The method according to claim 15, further comprising an authentication sensor fingerprint part selection phase (V3), wherein, after the authentication fingerprint computation phase (V2), the following steps are carried out by the user equipment:
transforming the computed fingerprint in a transformed domain, so as to obtain a transformed fingerprint,
selecting those pixels of the transformed fingerprint which have a horizontal and/or vertical spatial frequency greater than a threshold value, and
anti-transforming said selected pixels of the transformed fingerprint.

18. The computer program product which can be loaded into the memory of an electronic computer, and which comprises portions of software code for executing the phases of the method according to claim 15.

19. A method for registering a user equipment by an authentication device, comprising:
an image acquisition phase (E1), wherein a plurality of images are acquired by an image sensor,
a registration fingerprint computation phase (E2), wherein a registration sensor fingerprint is generated, through a central processing unit (CPU) comprised in said user equipment, on the basis of said plurality of images acquired during the image acquisition phase (E1),
a registration fingerprint compression phase (E4), wherein at least one portion of said registration sensor fingerprint is coded, through the CPU of the user equipment, by using a random projection algorithm, so as to generate at least one compressed portion (W) of said registration sensor fingerprint,
a registration fingerprint transmission phase (E5), wherein said at least one compressed portion (W) is transmitted to the device through a network interface comprised in said user equipment,
a random generation phase, wherein the device generates a random bit string,
a coding phase, wherein said random string is coded, through CPU comprised in the device, by using a polar coding technique, so as to obtain a coded random string,
an authentication information generation phase, wherein authentication information (IA) is generated, through the CPU of the device, on the basis of said coded random string and said at least one portion (W) of the registration fingerprint received by the device during the registration fingerprint transmission phase (E5),
a validation information generation phase, wherein validation information (VH) is generated, through the CPU of the device, on the basis of said random bit string, wherein said validation (VH) allows verifying when a user equipment can be authenticated,
a storing phase, wherein said authentication information (IA) and said validation information (VH) are stored into memory comprised in the device.

20. The method according to claim 19, wherein the authentication information (IA) comprises a bit string that, during the authentication information generation phase, is computed by executing a bitwise exclusive-OR operation between said coded random string and said at least one portion (W) of the registration fingerprint received by the device during the registration fingerprint transmission phase (E5).

21. The method according to claim 19, further comprising a registration sensor fingerprint part selection phase (E3), wherein, after the registration fingerprint computation phase (E2), the following steps are carried out by the CPU of the user equipment:
transforming the computed fingerprint in a transformed domain, so as to obtain a transformed fingerprint,
selecting those pixels of the transformed fingerprint which have a horizontal and/or vertical spatial frequency greater than a threshold value, and
anti-transforming said selected pixels of the transformed fingerprint.

22. The method according to claim 19, wherein during the registration fingerprint computation phase (E2) a set of instructions is executed which, before the authentication sensor fingerprint is generated, applies the Wiener filtering algorithm to each image acquired during the image acquisition phase (E1), so as to remove all periodic artifacts from said plurality of images.

* * * * *